(12) United States Patent
Kremesec et al.

(10) Patent No.: US 6,176,100 B1
(45) Date of Patent: Jan. 23, 2001

(54) REVERSIBLE INSULATING PROPERTIES CONTAINER AND METHOD OF USE

(76) Inventors: Garrick Kremesec, 201 S. Wright, Apt. 312, Champaign, IL (US) 61820; Paul Becke, 3022 Shore Dr. LH, Crawfordsville, IN (US) 47933

( * ) Notice: Under 35 U.S.C. 154(b), the term of this patent shall be extended for 0 days.

(21) Appl. No.: 09/307,697

(22) Filed: May 10, 1999

(51) Int. Cl.$^7$ ........................................ F25D 3/08
(52) U.S. Cl. .................. 62/457.3; 62/457.4; 62/530
(58) Field of Search ................ 62/457.3, 457.4, 62/530

(56) References Cited

U.S. PATENT DOCUMENTS

| | | | |
|---|---|---|---|
| 298,694 | * 5/1884 | Jewett | 62/457.4 |
| 1,721,311 | 7/1929 | Muenchen . | |
| 2,805,556 | * 9/1957 | Wang | 62/457.4 |
| 2,838,916 | 6/1958 | Sola | 62/77 |
| 3,229,478 | * 1/1966 | Alonso | 62/371 |
| 3,302,427 | * 2/1967 | Stoner et al. | 62/457.4 |
| 3,680,330 | 8/1972 | Canosa | 62/457 |
| 3,995,445 | * 12/1976 | Huskins | 62/371 |
| 4,232,532 | * 11/1980 | Marsh | 62/457 |
| 4,597,435 | * 7/1986 | Fosco, Jr. | 165/80.5 |
| 4,782,670 | * 11/1988 | Long et al. | 62/457 |
| 5,406,808 | * 4/1995 | Babb et al. | 62/457.4 |
| 5,607,076 | 3/1997 | Anthony | 220/501 |

* cited by examiner

Primary Examiner—William Doerrler
Assistant Examiner—Mark Shulman
(74) Attorney, Agent, or Firm—Knechtel, Demeur & Samlan

(57) ABSTRACT

The present invention provides an insulated container for cooling hot beverages to an acceptable temperature and then maintaining the beverage temperature in an acceptable temperature range for consumption. This invention has an upper reservoir and a lower reservoir surrounding a beverage chamber, the upper and lower reservoirs communicating with one another through at least one passageway having a two-way valve. A liquid located in the lower reservoir is permitted to flow into the upper reservoir through the valve. The thermal liquid removes some of the heat from the hot beverage. After the hot beverage reaches a satisfactory drinking temperature, the liquid is then allowed to flow back through the valve into the lower reservoir. The air in the upper reservoir maintains the beverage at a proper temperature. A method of use is also provided.

19 Claims, 4 Drawing Sheets

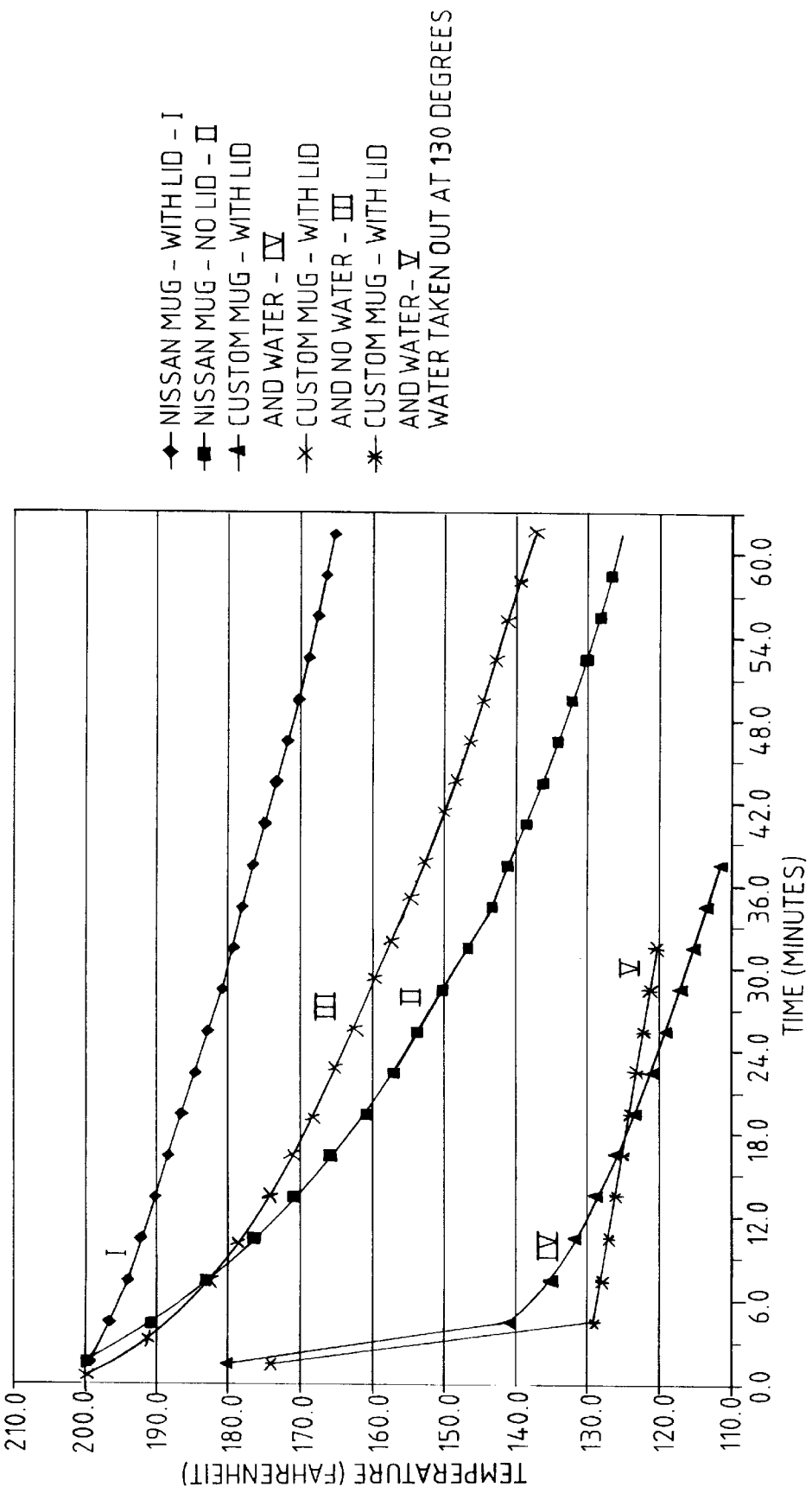

REVERSIBLE INSULATING PROPERTIES CONTAINER AND METHOD OF USE

I. TECHNICAL FIELD

The present invention relates to insulated containers and more particularly to insulated containers having an upper reservoir and a lower reservoir surrounding a beverage chamber, the upper and lower reservoirs communicating with one another by means of at least one passageway equipped with a two-way valve. A liquid located in the lower reservoir is permitted to flow into the upper chamber through the valve. The liquid transports heat from the hot beverage in the beverage chamber to both itself and away from the Device. After the hot liquid reaches a satisfactory drinking temperature, the liquid may then be allowed to flow back through the valve into the lower reservoir. In the preferred embodiment, the air in the upper reservoir maintains the beverage at a proper temperature for consumption.

II. BACKGROUND OF THE INVENTION AND PRIOR ART

It is often desirable to maintain beverages at a temperature suitable for drinking over an extended period of time. The problem, of course, is that left alone, a hot beverage in a container will continually cool until it reaches ambient temperature. Over the years, several attempts have been made to maintain the temperature of liquids in a container. The most notable example is the Thermos® insulated container. Generally, this device, and others like it, keep liquids at relative constant for extended periods so that they can be consumed at a later time. Also, hot liquids are often prepared and poured at extremely high temperatures, too hot for consumption, and must be cooled before they can be consumed. While these types of devices work well in situations in which a beverage is not to be immediately consumed, they are not effective for use when the beverage is to be consumed almost immediately upon being poured into the container: traditional insulated containers keep the liquids at too extreme a temperature for enjoyment.

Over the years, attempts have been made to create containers that alter the temperature of beverages before they are consumed. One example is seen in U.S. Pat. No. 5,607,076 to Anthony which discloses and claims a spill and scald resistant container designed to lower the temperature of a liquid before it is consumed. The device works in conjunction with a conventional cup. The cup, complete with liquids, is placed into the device in an inverted fashion and the device is sealed and inverted. The liquid in the cup then flows to an opening through a gap created between the device and the cup. The container itself draws heat from the liquid to lower the liquid's temperature. While this device recognizes the problems associated with cooling hot liquids before consumption, it is not without its shortcomings. A first shortcoming of this device is that it is difficult to use in that a conventional cup must be inserted into the device and the device inverted. This requires an appropriately sized cup, which may not be readily available. More importantly, there is an increased risk of spilling the hot liquid. A second shortcoming of this device is that it does not maintain the liquid at a desirable drinking temperature inasmuch as the device is constantly cooling the liquid.

Other examples of devices designed to alter the temperature of liquids in a container are found in U.S. Pat. Nos. 3,680,330, 2,838,916, 1,721,311, and 929,389. These devices all address the cooling of liquids before consumption.

There is need, therefore, for a simple self-contained device which permits a hot liquid to be cooled to a comfortable drinking temperature and maintains that temperature for a period of time.

III. OBJECTS OF THE INVENTION

It is an object of the present invention to provide a container for beverages which enables the cooling of a hot liquid to a comfortable drinking temperature.

It is a further object of the present invention to provide such a container which further maintains an acceptable drinking temperature for an extended period of time.

It is yet another object of the present invention to provide such a device that is self-contained.

IV. SUMMARY OF THE INVENTION

The above objects of the invention are provided for in a thermally reversible container. The container comprises a beverage chamber for holding liquids, the beverage chamber having a reversibly sealable drip proof lid. The side wall of the beverage chamber is surrounded by an upper reservoir. At the bottom of the beverage chamber is found a lower reservoir. The upper reservoir and the lower reservoir communicate with one another via at least one passageway equipped with a two-way valve. The upper and lower reservoirs are sealed and contain within them a liquid at room temperature. For purposes of this invention, room temperature is defined as about 50 degrees Fahrenheit to about 90 degrees Fahrenheit In use, the two-way valve is opened allowing the liquid to flow into the upper reservoir by inverting the device or mechanically forcing the liquid. After the fluid is in the upper reservoir, the valve is closed the Device righted. A hot beverage, such as coffee, tea, or a soup, is then placed into the beverage chamber. The liquid in the upper reservoir transport heat from the hot liquid, thereby cooling the liquid to a comfortable consumption temperature. The two-way valve is once again opened and the now heated thermal liquid flows back into the lower reservoir.

A combination of the warm thermal liquid in the lower reservoir and the air in the upper chamber maintains the beverage at a comfortable drinking temperature for a period of time sufficient to consume it. A method of use is also provided.

V. BRIEF DESCRIPTION OF THE DRAWINGS

FIG. 7 is a graph illustrating the temperature maintaining efficiency of the Device as compared to a readily obtainable insulated mug.

VI. DESCRIPTION OF THE PREFERRED EMBODIMENT

The description of the preferred embodiment will be better understood with reference to the appended drawings. It is also to be understood that while the description of the preferred embodiment is directed to the cooling and temperature maintenance of hot beverages, that the Device can also be used to maintain the temperature of cold liquids. The Device, however, will not cool the liquids further but, instead, will, through the same thermal properties as maintaining heat, keep the cold liquids cold for a longer period of time than if not used. Also, for clarity sake, the term beverage will be used throughout the description; the term is meant to refer to any liquid, such as coffee, or partial liquid, such as soup, that is placed into the Device's beverage chamber. Finally, while the drawings and descriptions reference the inventive device as being cylindrical in shape, as that is the most common shape for beverage containers, those skilled in the art will quickly understand that the principles involved will also work with containers of other shapes. Finally, while a two reservoir system arrayed as upper and lower reservoirs is described, other configurations, for example, multiple reservoirs or reservoirs arrayed concentrically, are also contemplated by the Inventors.

Figure 1:
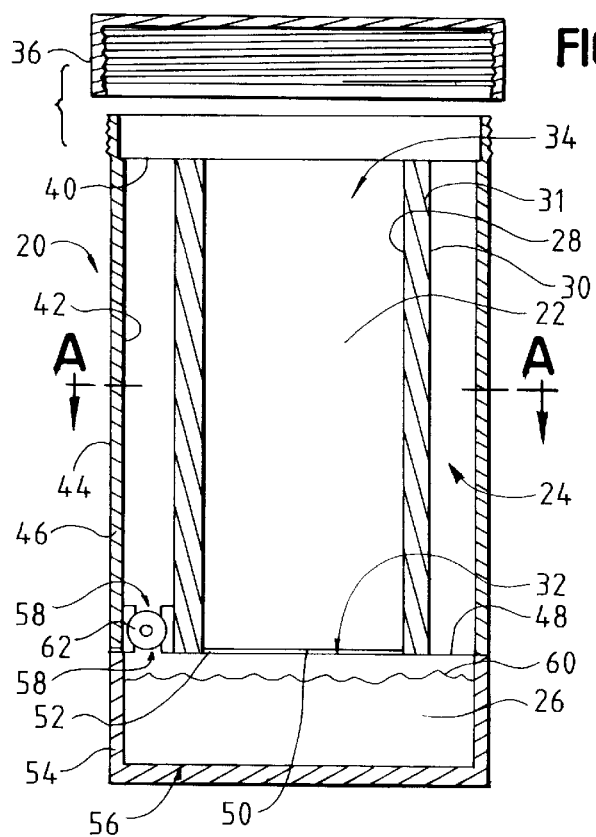
FIG. 1 depicts a side, cut away view of the Device in an empty state illustrating the beverage chamber, upper reservoir, lower reservoir, thermal liquid in the lower chamber, and the two-way valve.

Turning to FIG. 1, Device 20 is depicted in a side, cut away view. Device 20 can be manufactured in any of the standard materials and in the manners common to the art field. Although, plastic and stainless steel are probably the preferred materials. To more easily understand the design of Device 20 it is best to first think of it in ee sections: a beverage chamber 22, an upper reservoir 24, and a lower reservoir 26. Beverage chamber 22 is further defined by an inner wall 28 and an outer wall 30 which further define a beverage chamber wall 31, a bottom portion 32, an open top 34, and a lid 36. While the preferred embodiment illustrates a threaded open top 34 and threaded lid 36, any means for sealing beverage chamber is acceptable. For instance a friction seal may also be used. Open 34 further includes overhang 40 (more fully described below).

Figure 2:
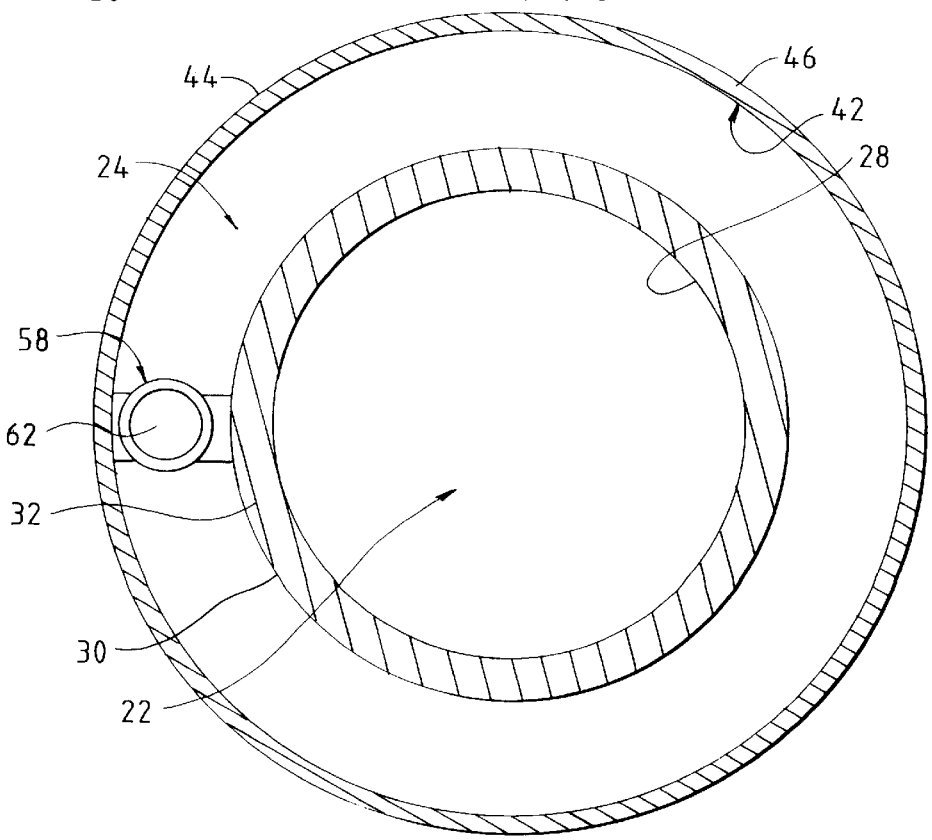
FIG. 2 depicts a cross sectional top view of the Device at point A of FIG. 1.

Upper reservoir 24 is further defined by an inner wall member 42 and outer wall member 44 which define side wall 46, beverage chamber outer wall 30, a bottom member 48. The circumference of upper reservoir side wall 46 is greater than the circumference of Beverage chamber wall 31. The side wall can also be viewed as a sleeve which fits down and over the smaller diameter beverage chamber. Upper reservoir 24 is there e created by the space between beverage chamber outer wall 30 and inner wall member 42. The circumference size difference between beverage chamber wall 31 and side wall 46 need only sufficient to permit an adequate thermal liquid exchange to take place (described in detail below This feature is seen in greater detail in FIG. 2. Upper reservoir bottom 48 is positioned in confluence with beverage chamber bottom 32. In fact upper beverage reservoir bottom 48 may molded as a single piece with beverage chamber bottom 32. Side wall 46 conjoins overhang 40 thereby creating a sealed reservoir.

Lower reservoir 26 is defined by a top 52, lower reservoir side wall member 54, and lower reservoir bottom portion 56. Lower reservoir 26 is affixed adjacent to beverage chamber bottom lower surface 50. Lower reservoir 26 is of sufficient diameter that it extends to and is flush with upper reservoir outer wall member 44. Lower reservoir 26 is of a capacity sufficient to hold liquid from the upper reservoir (described in detail below). Its bonding with upper reservoir 48 creates a sealed system.

The upper reservoir bottom member 48 and lower reservoir top 52 create a sealed system but have at least one communication passageway 58 (FIG. 2) between them. Passageway 58 permits liquid 60 to flow between the two reservoirs. A valve 62 is located in each passageway. Valve 62 can be closed by the user to trap liquid 60 in the desired reservoir. Any valve configuration or type is acceptable so long as it enables two-way flow and can be easily closed and opened.

Figure 3:
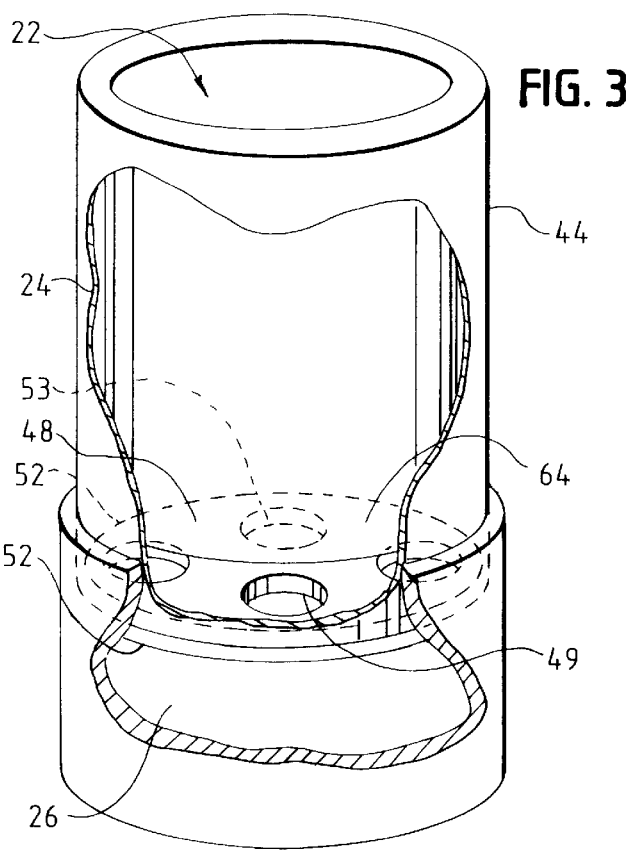
FIG. 3 depicts a close up of the two-way valve illustrating a disk type valve.
Figure 4:
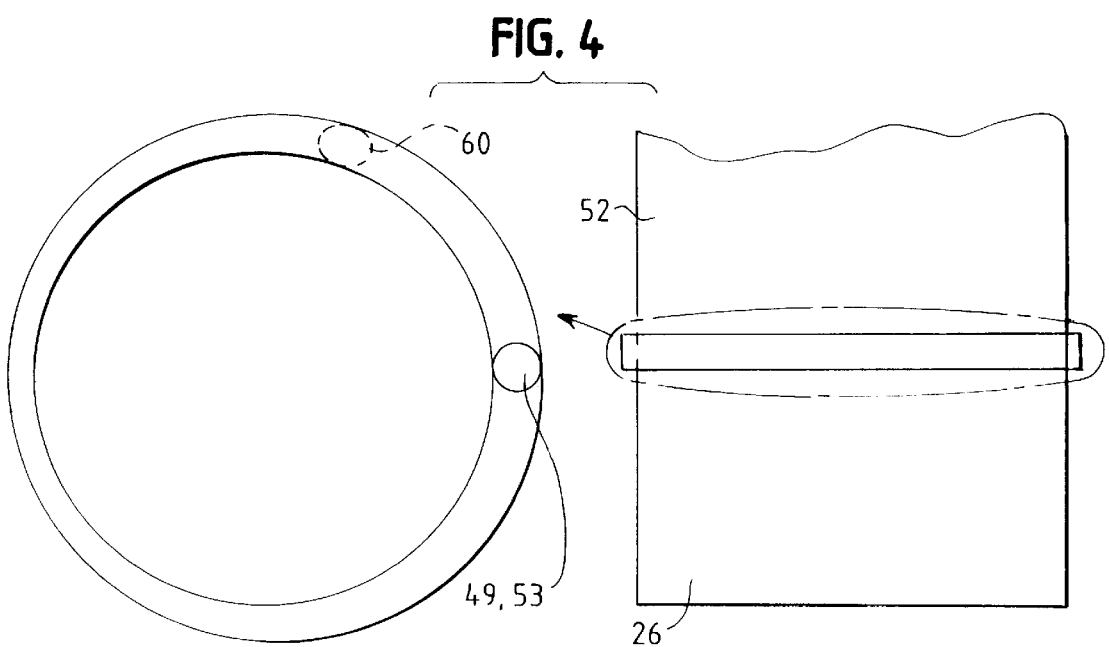
FIG. 4 depicts an alternate embodiment of the two-way valve illustrating a second type of disk valve.

FIG. 3 depicts a representative valve embodiment wherein a disk valve 64 is used. In this embodiment, upper reservoir bottom member 48 has one or more holes 49 extending through its thickness. Lower reservoir top 52 has corresponding holes 53 through its entirety. Lower reservoir 26 is rotationally mounted to upper reservoir 24. As lower reservoir 26 is rotated about its axis, upper reservoir holes 49 line up with lower reservoir holes 53, creating an opening of passageway 58. To close the passageway, lower reservoir 26 is rotated so that holes 49 and holes 53 do not line up. Alternatively, and as seen in FIG. 4, hole 49 and hole 53 may be in a fixed position with a rotatable disk, having corresponding slots 60, positioned between them. As the disk rotates, slots 60 line up with or are rotated away from holes 49 and holes 53.

Figure 5:
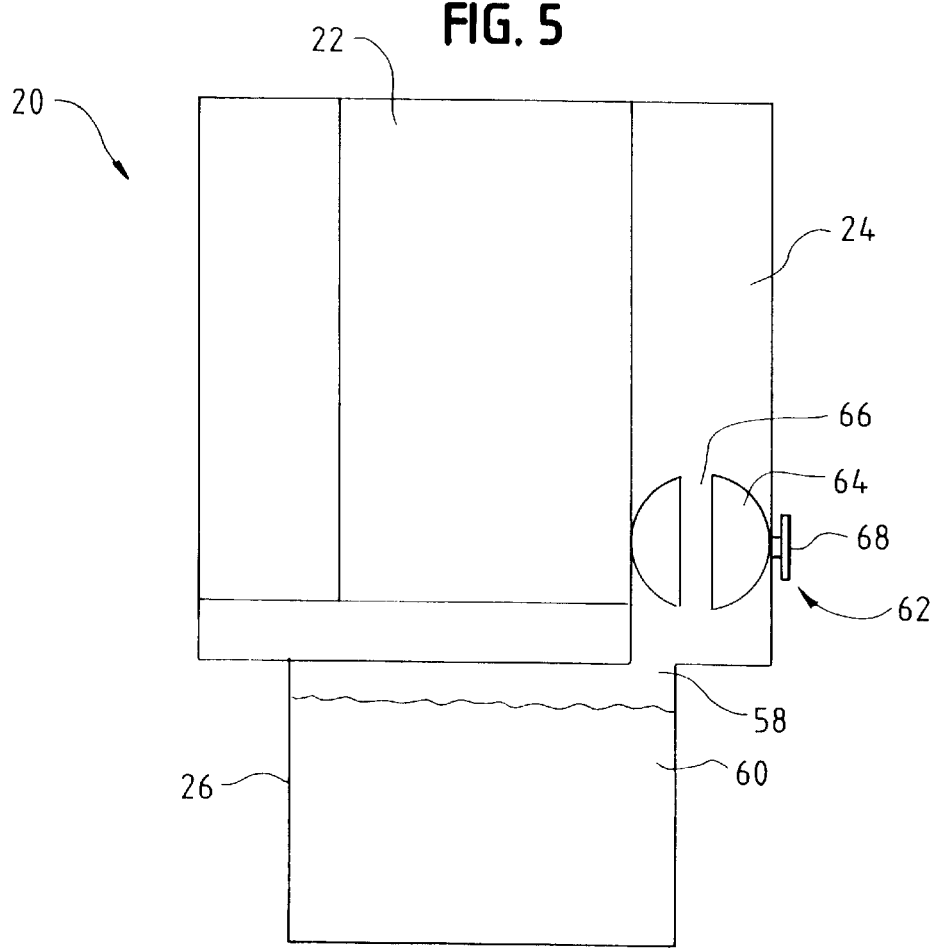
FIG. 5 depicts an alternate embodiment of the two-way valve illustrating a ball valve.

FIG. 5, shows yet another valve embodiment in which a ball valve 62 is used. Ball valve 62 comprises a ball 64 having a hollow tube-like member 66 extending through its entire diameter. Ball valve 62 is positioned in a passageway. By manipulation of knob 68, tube-like member 66 can be lined in passageway to allow or prevent flow of liquid 60. Other valve systems may also work and are limited only by the above described requirements.

Liquid 60 is placed in the sealed system created by upper reservoir and lower reservoir before Device 20 is finally produced. Liquid 60 can be any liquid which has thermal conductive properties to absorb energy in the form heat expended from a hot beverage placed in beverage chamber 22. While pure water will work, the inventors have found that additives which increase absorption are superior. Also, An antifreeze agent should be added to the liquid to prevent damage to Device 20 due expansion secondary to freezing if it is in advertently left in the cold.

Figure 6:
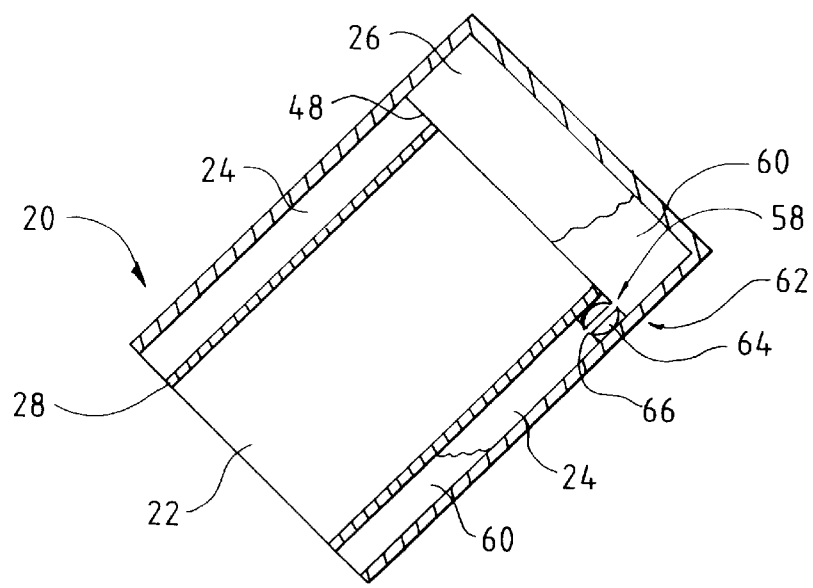
FIG. 6 depicts a side, cut away view of the Device illustrating the Device in an inverted position with the valve open and the liquid flowing from the lower chamber to the upper chamber.

In use, liquid 60 is in lower reservoir 26. Valve 62 is then opened and Device 20 is inverted (FIG. 6), allowing liquid 60 to flow through passageway 58 into upper reservoir 24. After liquid 60 is in upper reservoir 24, valve 62 is closed and Device 20 is righted. A hot beverage is then placed in beverage chamber 22.

The heat of the hot beverage is absorbed by liquid 60. When the proper temperature is reached, as determined by the user, the valve is opened and the liquid is allowed to flow back into the lower reservoir, after which the valve is again closed. The air in the upper reservoir now enables the beverage to stay at the predetermined temperature range for a period of time sufficient to consume the beverage.

FIG. 7 illustrates the temperature maintaining properties of Device 20. As can be seen, a readily available insulated mug having properties similar to most insulated mugs is depicted in I and II. In I, the mug is used with a lid and the starting temperature is 200 degrees Fahrenheit. Over a period of an hour, the temperature drops only to approximately 167 degrees Fahrenheit, still at a temperature that can cause burns. Also, the temperature makes a sustained fall without experiencing any meaningful plateaus. In II, the mug is used without a lid and the starting temperature is also 200 degrees Fahrenheit. While the temperature falls more quickly than in I, it still makes a sustained fall. Also, it takes approximately 36 minutes before the beverage is in a temperature range in which it can be safely consumed.

Number III represents a test performed with Device 20 wherein no liquid in placed in the reservoirs and a lid is used. As can be seen, the temperature drops similarly to the standard mug.

In Number IV, Device 20 is used with a lid and the liquid kept in the upper reservoir (it was not allowed to flow back into the lower reservoir). As can be seen, the temperature drops almost immediately from 200 degrees Fahrenheit to 140 degrees Fahrenheit. The temperature then makes a slow but steady fall to 110 degrees Fahrenheit within approximately 34 minutes.

Turning to V, the superior functioning of Device 20 is illustrated. A hot beverage was placed in the beverage chamber measuring 200 degrees Fahrenheit. Within four minutes, the temperature dropped to approximately, 129 degrees Fahrenheit at which time the liquid was allowed to drain from the upper reservoir into the lower reservoir. The beverage temperature then made a slow temperature drop to 120 degrees Fahrenheit, 9 degrees Fahrenheit overall, during a period of approximately 30 minutes.

The inventors believe that the primary reason for the effects of the invention are due to the creation of an upper reservoir filled with either room temperature liquid to create the quick change in thermal energy, or air to insulate against a change in thermal energy. However, it is also believed that some of the effect comes from the reverse radiation of heat coming from the warmed liquid acting on the air in the upper chamber and conductive heat exchange through the bottom of the beverage chamber from the lower reservoir.

The above description is for illustration purposes only. As those skilled in the art ill quickly understand, there are many variations of the invention which fall into the spirit of the invention, the invention to be only limited by the appended claims.

We claim:

1. A container for cooling beverages to an acceptable temperature and then maintaining that beverage temperature for sufficient time to consume the beverage comprising:
   a beverage chamber for receiving the beverage defined by an open top, means for reversibly sealing the top, at least one side wall having an inner portion and an outer portion, and a bottom;
   an upper reservoir disposed around the outer portion of the at least one side wall of the beverage chamber;
   a lower reservoir adjacent to the bottom of the beverage chamber;
   at least one passageway between the upper reservoir and the lower reservoir;
   a liquid disposed in the upper reservoir for absorbing heat from the beverage in the beverage chamber, the liquid in sufficient amount that it can fit in either the upper reservoir or the lower reservoir; and,
   a valve associated with the at least one passageway, the valve enabling the bi-directional flow of the liquid between the upper reservoir and the lower reservoir to regulate the temperature of the beverage.

2. The container of claim 1 wherein the means for reversibly sealing the open top is a threaded member, the open top having complimentary threads.

3. The container of claim 1 wherein the means for reversibly sealing the open top is a friction lid.

4. The container of claim 1 wherein the liquid has thermal conductive properties.

5. The container of claim 1 where the liquid is initially at about room temperature, which is defined to be about 10 to about 50 degrees Fahrenheit.

6. The container of claim 1 where the liquid is initially chilled to a temperature below room temperature or heated about room temperature for the purposes of increasing the rate in which the beverage is either cooled or heated.

7. The container of claim 1 wherein the liquid has antifreeze additives.

8. The container of claim 1 wherein the valve is a ball valve.

9. The container of claim 1 wherein the valve is a disk-type valve.

10. The container of claim 1 wherein the valve is electrically operated.

11. A container for beverages comprising an outer sleeve having an inner portion, an outer portion and a lower edge, a beverage chamber of a smaller diameter than that of the outer sleeve and having an inner wall, an outer wall and a second lower edge, the beverage chamber being inserted into the outer sleeve, the space between the outer sleeve and the beverage chamber thereby defining an upper reservoir, a lower reservoir having a side wall, a top, and a bottom, the lower reservoir disposed adjacent to and below the lower edge and the second lower edge thereby creating a bottom to the beverage chamber and the upper reservoir, a passageway communicating the lower reservoir and the upper reservoir, a liquid disposed within the upper and lower reservoirs, the liquid having antifreeze additives, and a valve associated with the passageway to control the flow of the liquid between the lower and upper reservoirs.

12. The container of claim 11 wherein the liquid has thermal conductive properties.

13. The container of claim 11 where the liquid is initially at about room temperature, which is defined to be about 10 to about 50 degrees Fahrenheit.

14. The container of claim 11 where the liquid is initially chilled to a temperature below room temperature or heated about room temperature for the purposes of increasing the rate in which the beverage is either cooled or heated.

15. The container of claim 11 wherein the valve is a ball valve.

16. The container of claim 11 wherein the valve is a disk-type valve.

17. The container of claim 11 wherein the valve is electrically operated.

18. A method of cooling a hot beverage to an acceptable consumption temperature and then holding the temperature within an acceptable consumption range using a container having a beverage chamber for holding the beverage, a liquid for cooling the beverage, an upper reservoir for containing the liquid as the liquid cools the beverage, a lower reservoir for storing the liquid when it is not in the upper reservoir, the lower reservoir communicating with the upper chamber via at least one passageway having a valve comprising the steps of:
   placing the liquid in the upper reservoir, and closing the valve so that the liquid cannot flow to the lower reservoir the liquid being retained in the upper reservoir until released to the lower reservoir as desired;
   putting a hot beverage into the beverage chamber;
   cooling the hot beverage by relying in part on heat transfer to the liquid in the upper reservoir; and
   opening the valve after the beverage has reached a desirable temperature and allowing the liquid to flow from the upper reservoir into the lower reservoir.

19. The method of claim 14 including the further step of closing the valve once the liquid is in the lower reservoir.

* * * * *